May 17, 1938.  E. ROSS  2,118,016
SPROCKET FOR MOTION PICTURE FILMS
Filed April 11, 1935
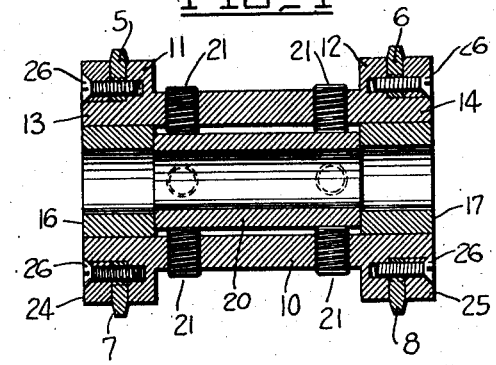
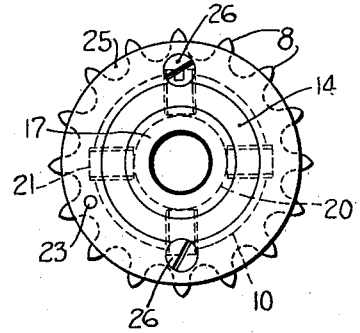
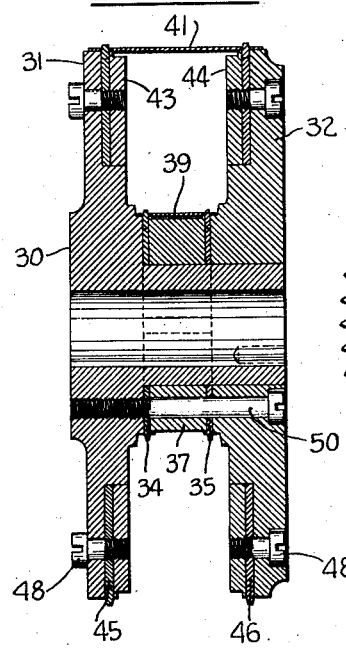
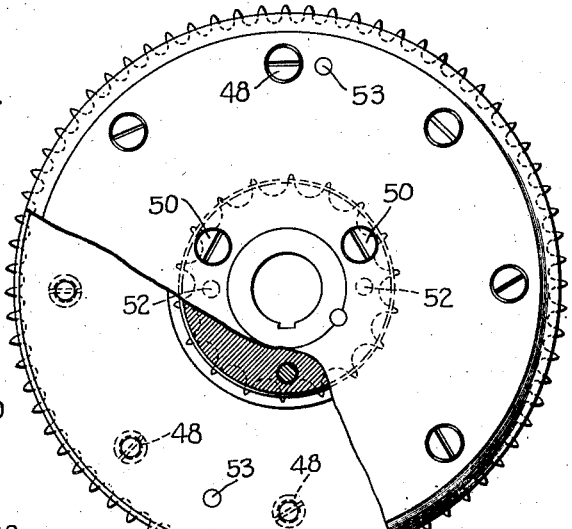
INVENTOR
Ernest Ross
BY
ATTORNEY Patented May 17, 1938

2,118,016

UNITED STATES PATENT OFFICE 2,118,016

SPROCKET FOR MOTION PICTURE FILMS

Ernest Ross, Elmhurst, N. Y., assignor to United Research Corporation, Long Island City, N. Y., a corporation of Delaware Application April 11, 1935, Serial No. 15,771

7 Claims. (Cl. 74—243)

This invention relates to sprockets for longitudinally progressing strips of flexible material and particularly to sprockets for driving motion picture film, the sprockets having sets of teeth spaced apart to engage perforations in the film.

The use of sprockets in motion picture machines for recording or reproducing pictures and/or sound is well known and many different types of sprockets for this purpose have been suggested and used. With the advent of sound on film, more attention has been given to the progressing and guiding of the film through the machines and the maximum tolerances have been reduced materially. For instance, as the sound track occupies a narrow portion longitudinally of the film, the film cannot be permitted to weave or vary in linear velocity to any considerable extent at the point of translation, otherwise distortion is introduced into the recording and eventual reproduction of the sound. Similarly there should be substantially no movement of the film away from and toward the axis of rotation of the sprocket, such movement introducing velocity variations causing blurring and out of focus records with consequent sound distortion. The driving sprockets for talking motion picture film, therefore, should permit a smooth and uniform progressing of the film over the shoulders of the sprocket upon which the film rests, the sprocket teeth entering the perforations without shifting the film's position on the shoulders while permitting the film to disengage the sprocket teeth smoothly without jerkiness or chattering.

As there is always a certain amount of foreign matter such as dust or loose emulsion upon the film, which may be separated therefrom as the sprocket teeth enter and leave the perforations of the film, a place for this material has been provided intermediate or around the sprocket teeth where its accumulation will not vary the position of the film on the sprocket. The sprocket teeth may be cut in pairs to provide perfect coordination therebetween, the sprocket being made up of sections to facilitate assembling and adjustment upon the driving shaft, the object of the invention being to provide an economic sprocket assembly which drives the film smoothly and uniformly through the machine and which prevents the accumulation of foreign matter from interfering with this action.

Although the novel features of this invention will be particularly pointed out in the claims appended hereto, the invention itself as to its object and advantages, the mode of its operation, and the manner of its organization, may be better understood by referring to the following description read in conjunction with the accompanying drawing, in which Figs. 1 and 2 are a cross-sectional view and an end view, respectively, of one type of sprocket embodying the invention;

Figs. 3 and 4 are a cross-sectional view and a sectional end view, respectively, of a combination sprocket embodying the invention; and Fig. 5 is a partial cross-sectional view of a modification of the assembly of Figs. 1 and 2.

Referring specifically to Figs. 1 and 2, the sprocket assembly shown includes two sprocket teeth sections or rings 5 and 6 having teeth 7 and 8, respectively. A barrel portion 10 has shoulder portions 11 and 12 at each end thereof and narrower hub portions 13 and 14 at its extremities. Positioned within the barrel 10 are hollow cylindrical end sections 16 and 17 between which is a movable hollow cylindrical section 20 of somewhat smaller internal diameter than sections 16 and 17 and adjustable in position by means of a plurality of set screws 21. This construction permits the sprocket axis to be adjusted to coincide with the driving shaft axis although the sprocket may be constructed without this feature.

The sprocket teeth rings 5 and 6 fit snugly over the hubs 13 and 14 and are positioned by dowels 23 (see Fig. 2). To support the outer edges of the film, collars 24 and 25 are provided having an internal diameter to fit the hubs 13 and 14, respectively, and an external diameter the same as the shoulders 11 and 12 of the barrel 10. The collars are held in position by means of screws 26 which pass through drilled holes in the sprocket tooth rings 5 and 6 and into tapped holes in the shoulders 11 and 12 of the barrel 10, the screw holes in the collars 24 and 25 being countersunk to prevent the screw heads from projecting beyond the end of the barrel 10. The dowels 23 accurately align the sprocket teeth 8 with the sprocket teeth 7 so that they operate in pairs while the set screws 21 permit accurate axial alignment of the sprocket upon its driving shaft.

It will be observed in Fig. 2 that the collars 24 and 25 and shoulder portions 11 and 12 have external diameters greater than the root diameters of the sprocket teeth, thus providing recesses which may collect foreign matter such as particles of dust, film, or emulsion, deposited by the action of the film passing over the sprocket. The depositing of this matter in these spaces prevents collection thereof on the collars and shoulders upon which the film rides, thus maintaining the film at its proper distance from the associate recording or reproducing apparatus, if the translation point is on the sprocket.

In Figs. 3 and 4 the features of the above sprocket have been incorporated in a sprocket for driving two films of different sizes, such for example as a 35 mm. film 41, and a 16 mm. film 39. In addition to these features this sprocket has been constructed to obtain the proper travel relationship between the two sizes of film by the manner of assembling. The sprocket shown has a barrel portion 30 with an extending collar portion 31 at one end thereof, and a similar extending portion 32 at the other end not integral with the portion 30. The section 31 and the collar 32 are properly spaced from each other by sprocket teeth rings 34 and 35 for the film 39, and a cylindrical spacing ring 37, the ends of which have a larger diameter than the main portion of the ring to form shoulders for supporting the film. The supporting shoulders for the external edges of film 39 are formed from section 31 and collar 32, as illustrated. For the film 41, the section 31 and collar 32 also form the support for the external edges of the film, while collars 43 and 44 with extensions on respective ends thereof form the support for film 41 immediately adjacent the film perforations. The sprocket teeth rings 45 and 46 drive the larger film in synchronism with the smaller film 39 as the entire sprocket rotates as a unit after once assembled.

The large sprocket teeth rings 45 and 46 are maintained in position by means of screws 48 through the sections 31, 32, 43, and 44, the smaller sprocket ring and the whole assembly being held in position by screws 50, which pass transversely of the entire assembly. The smaller sprocket tooth sections are aligned and held in alignment by means of dowels 52 (see Fig. 4), and the larger sprocket tooth rings maintained in paired position by means of dowels 53, the location of these dowels being previously determined to provide the desired and proper relationship between the inner or smaller teeth and the outer or larger teeth. This relationship is dependent upon the difference in size of the films being simultaneously progressed by the sprocket and the difference in diameters between the sprockets. This sprocket is particularly useful for reduction printing and a printer utilizing this type of sprocket is disclosed and claimed in a copending application Serial No. 31,968 filed July 18, 1935. The sprocket itself is being claimed in a divisional application Serial No. 190,908, filed Feb. 17, 1938.

Similarly to the sprocket of Figs. 1 and 2, the teeth of this sprocket have root diameters less than the external diameters of the shoulders which support the film thus providing recesses or pockets for the collection of extraneous matter which may be collected during operation. Both types of sprockets are easily assembled and can be economically constructed.

In the modification of the sprocket in Figs. 1 and 2 shown in Fig. 5, the barrel 55 has its shoulders bevelled or chamfered at 56 and 57. Similarly bevelled at 59 and 60 are the collars 62 and 63, respectively, both sets of edges providing circumferential grooves along the sides of the sprocket teeth on rings 65 and 66. Dowel pins 67 and 68 position and maintain the rings 65 and 66 in a fixed cooperating relationship to each other and with the barrel 55. In this modification no screws are employed to hold the collars to the hubs of barrel 55 as they are heated and shrunk on the hubs.

An advantage of this assembly is that the grooves not only provide additional space for foreign matter to accumulate, but permit the shoulders and collars upon which the film rides to be ground after assembly to obtain perfect coincident cylindrical surfaces, the axis of which corresponds to the axis of rotation. This is especially desirable in the case of the collars which, although they may be ground perfectly circular independently, may, nevertheless, have their surfaces slightly out of line when assembled.

A particularly important feature of the sprockets above disclosed is the manner in which the sprocket teeth can be paired and lapped. Sprockets of the solid type having recessing between the teeth, necessitate transverse grinding and lapping in view of the integral nature of the barrel and tooth portions. In the present sprockets, however, a plurality of rings from which the teeth are to be cut may be mounted together on a mandrel and the teeth cut simultaneously, thus providing a perfect uniformity to all teeth so far as angular pitch is concerned. For lapping, one or more of the sections may be ground with a rotating grinding tool positioned transversely thereof and which may be moved, as it rotates, from the throat to the tip of a tooth in the direction that the film leaves the teeth. By so lapping no transverse ridges are formed to cause the film to chatter as it slides off the tooth, but permits a smooth separation between the tooth and the film. The method and means for lapping sprocket teeth in this manner is disclosed and claimed in my copending application Serial No. 17,892 filed April 24, 1935.

It has been found that motion picture film is progressed through the various types of machines, such as cameras, reproducers, and printers, with greater accuracy and with less attention with this type of sprocket than with those formerly known.

What is claimed is:

1. A sprocket assembly for a film having apertures along its opposite sides comprising in combination, a body having cylindrical barrel portions at opposite ends thereof of a certain diameter and hubs extending outwardly from said barrel portions of less diameter than that of said barrel portions forming end faces at the ends of said barrel portions, toothed sprocket members having bores receiving said hubs and abutting the said end faces, clamp collars on said hubs abutting the outer sides of said sprocket members of a diameter substantially equal to that of the barrel portions, the said sprocket members and collars being provided with apertures, pins extending from said barrel portions receivable in certain of said apertures of the sprocket members, and screws passing through the apertures in said collars and certain apertures of said sprocket members threadedly engaging said barrel portions, the teeth of said sprocket members being formed to provide root diameters for the sprocket members in the spaces between said teeth which are less than said certain diameter to form depressions between adjacent faces of adjacent teeth and adjacent edges of adjacent barrel portions and collars, co-extensive with the sides of said teeth, all adapted and arranged whereby an apertured film receiving the teeth of the sprocket members and contacting said barrel portions is out of contact with and spaced from the sprocket members over said depressions but is supported by said barrel portions and collars immediately adjacent the sides of said teeth.

2. A sprocket for a film having apertures along the opposite sides comprising in combination, a body having cylindrical barrel portions at opposite ends thereof of a certain diameter, hubs extending outwardly from said barrel portions which are of less diameter than that of said barrel portions providing end faces at the ends of said barrel, toothed sprocket members having bores receiving said hubs abutting said end faces, clamp collars on said hubs against said sprocket members, and means causing the collars to clamp the sprocket members to the end faces of the barrel portions, the said sprocket members having the teeth thereof formed to provide root diameters in the spaces between the teeth less than said certain diameter of the barrel portions whereby an apertured film bearing on the barrel portions with its apertures receiving the teeth of the sprocket members will be spaced above said root diameter of the sprocket members.

3. A sprocket assembly comprising a barrel portion having cylindrical shoulder portions at opposite ends thereof of a certain diameter, hubs extending from said shoulder portions of less diameter than said barrel portion, two sprocket members adapted to fit on said hubs and abut said shoulder portions, clamp collars adapted to fit said hubs and abut said sprocket members, means for maintaining said sprocket members in a definite position with respect to said shoulder portions and with each other, and means for maintaining said collars in position on said hubs, the teeth of said sprocket members being formed to provide root diameters less than the external diameters of said shoulder portions and said collars, said shoulder portions and collars having the same external diameter.

4. A sprocket assembly comprising a cylindrical body portion, an independent cylindrical portion within said body portion, means for varying the angular relationship of the axis of said internal cylindrical portion with respect to the axis of said body portion, shoulders formed at the ends of said body portion, sprocket teeth members adjacent said shoulders, and clamp collars adjacent said sprocket teeth members for maintaining said sprocket teeth members on said body portion.

5. A sprocket assembly comprising a cylindrical body portion, an internal cylindrical portion adapted to be placed upon a driving shaft, means for varying the angular relationship of the axis of said internal portion with respect to the axis of said body portion thereby adjusting said body portion with respect to the driving shaft, shoulder portions formed at the end of said body portion of a larger diameter than said body portion, sprocket teeth members adapted to abut said shoulder portions, means for maintaining said sprocket teeth members in position with respect to each other and to said body portion, collar members adapted to abut said sprocket members, and means for maintaining said sprocket teeth members and said collar members in assembly.

6. A sprocket assembly for films having apertures along their opposite sides comprising in combination, a body having a plurality of cylindrical portions of different diameters, hubs extending from said cylindrical portions of lesser diameters than that of said cylindrical portions forming end faces on said cylindrical portions, a plurality of toothed sprocket members having bores adapted to receive said hubs and abut said end faces, clamp collars for said hubs abutting the outer sides of said sprocket members of a diameter substantially equal to that of said cylindrical portions, the said sprocket members and collars being provided with apertures, pins extending from said cylindrical portions receivable in certain of said apertures of said sprocket members, and screws passing through apertures in said collars and certain apertures of said sprocket members for causing said collars to clamp said sprocket members to the end faces of said cylindrical portions, the teeth of all of said sprocket members being formed to provide root diameters for the sprocket members in the spaces between said teeth which are less than the diameter of said collars to form depressions between adjacent faces of adjacent teeth and adjacent edges of adjacent cylindrical portions and collars, co-extensive with the sides of said teeth, all adapted and arranged whereby apertured films receiving the teeth of the sprocket members and contacting said cylindrical portions are out of contact with and spaced from the sprocket members over said depressions but are supported by said cylindrical portions and collars immediately adjacent the sides of said teeth.

7. A sprocket assembly comprising a plurality of sprocket members having teeth therein, said members having bores, a plurality of hub members adapted to receive the bores of said sprocket members, a plurality of collar members adapted to abut said sprocket members and maintain said sprocket members on said hubs, shoulder members adjacent said sprocket members, means for maintaining the teeth of said sprocket members in definite positions with respect to one another, and means for maintaining said sprocket members and collar members in fixed position with respect to one another, the teeth of said sprocket members being formed to provide root diameters for the sprocket members in the spaces between said teeth which are less than the diameter of said collar members to form depressions between adjacent faces of adjacent teeth and adjacent edges of adjacent shoulder and collar members, co-extensive with the sides of said teeth, all adapted and arranged whereby apertured films receiving the teeth of the sprocket members and contacting said shoulder and collar members are out of contact with and spaced from the sprocket members over said depressions but are supported by said shoulder and collar members immediately adjacent the sides of said teeth.

ERNEST ROSS.